(12) United States Patent
Yang

(10) Patent No.: US 9,464,676 B2
(45) Date of Patent: Oct. 11, 2016

(54) TORQUE-ACTUATED CLUTCH

(71) Applicant: Tai-Her Yang, Dzan-Hwa (TW)

(72) Inventor: Tai-Her Yang, Dzan-Hwa (TW)

( * ) Notice: Subject to any disclaimer, the term of this patent is extended or adjusted under 35 U.S.C. 154(b) by 0 days.

(21) Appl. No.: 14/105,545

(22) Filed: Dec. 13, 2013

(65) Prior Publication Data

US 2014/0097058 A1    Apr. 10, 2014

Related U.S. Application Data

(62) Division of application No. 12/805,282, filed on Jul. 22, 2010, now Pat. No. 8,657,089.

(51) Int. Cl.
| | | |
|---|---|---|
| *F16D 11/04* | (2006.01) | |
| *F16D 11/14* | (2006.01) | |
| *F16D 13/02* | (2006.01) | |
| *F16D 13/24* | (2006.01) | |
| *F16D 13/38* | (2006.01) | |
| *F16D 41/04* | (2006.01) | |
| *F16D 43/20* | (2006.01) | |
| *F16D 43/21* | (2006.01) | |
| *F16D 47/04* | (2006.01) | |
| *B24B 23/02* | (2006.01) | |
| *B24B 47/12* | (2006.01) | |

(52) U.S. Cl.
CPC .............. *F16D 43/20* (2013.01); *F16D 43/21* (2013.01); *F16D 43/215* (2013.01); *F16D 43/218* (2013.01); *B24B 23/028* (2013.01); *B24B 47/12* (2013.01); *F16D 11/04* (2013.01); *F16D 11/14* (2013.01); *F16D 13/02* (2013.01); *F16D 13/24* (2013.01); *F16D 13/38* (2013.01); *F16D 41/04* (2013.01); *F16D 47/04* (2013.01)

(58) Field of Classification Search
None
See application file for complete search history.

(56) References Cited

U.S. PATENT DOCUMENTS

| | | |
|---|---|---|
| 2,663,397 A | 12/1953 | Scott |
| 3,224,541 A | 12/1965 | Yoshizo |
| 3,656,597 A | 4/1972 | Gruchmann et al. |
| 3,810,533 A | 5/1974 | Densow |
| 4,538,713 A | 9/1985 | Wasada |
| 4,889,215 A | 12/1989 | Ohkanda |
| 2012/0018270 A1* | 1/2012 | Yang ............................ 192/31 |

* cited by examiner

*Primary Examiner* — Jacob S Scott
(74) *Attorney, Agent, or Firm* — Bacon & Thomas, PLLC

(57) ABSTRACT

The present invention relates to a clutch actuated by torque capable of controlling a clutch device to perform operations of coupling or disengaging with the driving torque, characterized in that a relay transmission structure assembly (104) is installed between a rotary prime motive end (101) and an output-end clutch structure (1052), the relay transmission structure assembly (104) is installed with a relay coupling structure (204) having an active side of relay coupling structure and a passive side of relay coupling structure, a limit-torque sliding damping device (106) is installed between the relay transmission structure assembly (104) and the static housing (107).

10 Claims, 5 Drawing Sheets

TORQUE-ACTUATED CLUTCH

CROSS-REFERENCE TO RELATED APPLICATION

This application is a divisional of U.S. patent application Ser. No. 12/805,282, filed Jul. 22, 2010, and now allowed.

BACKGROUND OF THE INVENTION (a) Field of the Invention

A torque-actuated clutch is disclosed, characterized in that being capable of controlling a clutch device to perform operations of coupling or disengaging with the driving torque, and being equipped with a relay transmission structure assembly (104) between a rotary prime motive end (101) and an output-end clutch structure (1052) installed at an output end (102), the relay transmission structure assembly (104) is installed with a relay coupling structure (204) having an active side of relay coupling structure and a passive side of relay coupling structure, the prime motive end (101) is provided with a limiting structure (115) for limiting relative positions of the relay transmission structure assembly (104) and the prime motive end (101);

a limit-torque sliding damping device (106) is installed between the relay transmission structure assembly (104) and the static housing (107) and is rotated in a first rotation direction at the prime motive end (101), so when the active side of relay coupling structure of the relay coupling structure (204) installed in the relay transmission structure assembly (104) is driven, a damping effect is generated by the limit-torque sliding damping device (106) installed between the relay transmission structure assembly (104) and the static housing (107) such that the passive side of relay output coupling structure is driven by the active side of relay coupling structure to be moved, and thereby to drive the relay transmission structure assembly (104) and a relay output clutch structure (1051) installed in the relay transmission structure assembly (104) to perform closing/opening operations with the output-end clutch structure (1052) installed at the output end (102) so as to transmit rotary kinetic energy, and to force a recovering actuation spring (120) provided between the relay output clutch structure (1051) and the output-end clutch structure (1052) being tightened;

when the rotary driving torque at the prime motive end (101) is no longer provided, through actions of the recovering actuation spring (120), the relay transmission structure assembly (104) is returned and the relay output clutch structure (1051) and the output-end clutch structure (1052) are separated, thereby the output end (102) is released.

(b) Description of the Prior Art

A conventional single-way clutch (S.W.C.) or an over running clutch (O.R.C) has following transmission features:

when an active side is driven in one rotational direction, e.g. the clockwise direction, a passive side is able to be linked; on the other hand, when the passive side is driven in the counterclockwise direction, the active side is able to be linked;

when the active side is driven in the counterclockwise direction, the passive side is not able to be linked; when the passive side is driven in the clockwise direction, the active side is not able to be linked, the abovementioned are its transmission features;

when the active side is desired to be driven in one of the directions, e.g. the clockwise direction, the passive side is able to be linked for rotational outputting, and when the passive side is driven in the counterclockwise direction, the active side is not able to be linked, which is not the function that the conventional single-way transmission device can provide.

SUMMARY OF THE INVENTION

A torque-actuated clutch is disclosed, characterized in that being capable of controlling a clutch device to perform operations of coupling or disengaging with the driving torque, and being equipped with a relay transmission structure assembly (104) between a rotary prime motive end (101) and an output-end clutch structure (1052) installed at an output end (102), the relay transmission structure assembly (104) is installed with a relay coupling structure (204) having an active side of relay coupling structure and a passive side of relay coupling structure, the prime motive end (101) is provided with a limiting structure (115) for limiting relative positions of the relay transmission structure assembly (104) and the prime motive end (101);

a limit-torque sliding damping device (106) is installed between the relay transmission structure assembly (104) and the static housing (107) and is rotated in a first rotation direction at the prime motive end (101), so when the active side of relay coupling structure of the relay coupling structure (204) installed in the relay transmission structure assembly (104) is driven, a damping effect is generated by the limit-torque sliding damping device (106) installed between the relay transmission structure assembly (104) and the static housing (107) such that the passive side of relay output coupling structure is driven by the active side of relay coupling structure to be moved, and thereby to drive the relay transmission structure assembly (104) and a relay output clutch structure (1051) installed in the relay transmission structure assembly (104) to perform closing/opening operations with the output-end clutch structure (1052) installed at the output end (102) so as to transmit rotary kinetic energy, and to force a recovering actuation spring (120) provided between the relay output clutch structure (1051) and the output-end clutch structure (1052) being tightened;

when the rotary driving torque at the prime motive end (101) is no longer provided, through actions of the recovering actuation spring (120), the relay transmission structure assembly (104) is returned and the relay output clutch structure (1051) and the output-end clutch structure (1052) are separated, thereby the output end (102) is released.

DESCRIPTION OF MAIN COMPONENT SYMBOLS

Figure 1:
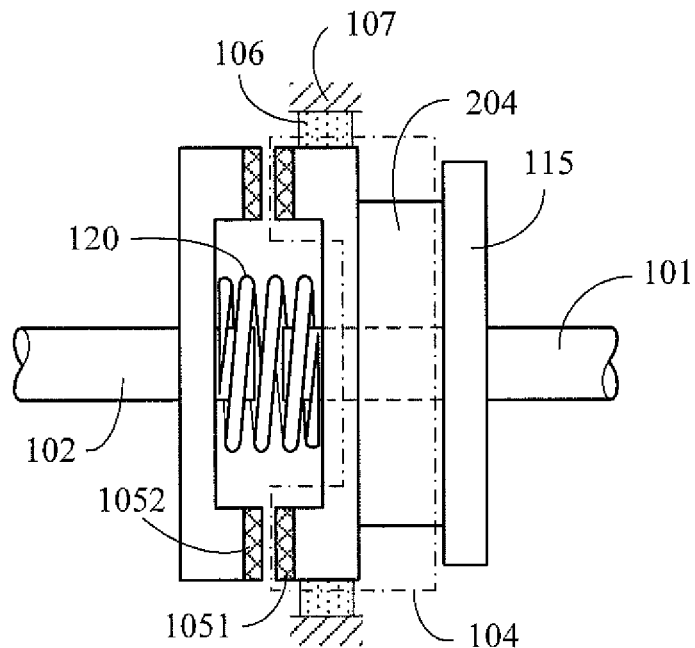
FIG. 1 is a schematic view of the structural theory of the clutch actuated by torque of the present invention.

101: prime motive end
102: output end
104: relay transmission structure assembly
106: limit-torque sliding damping device
107: static housing
115: limiting structure
120: recovering actuation spring
204: relay coupling structure
1041: screw rod structure
1042: screw nut structure
1043: coil-shaped spring capable of rotating for axial actuation
1051: relay output clutch structure
1052: output-end clutch structure
1060: axial compelling over running clutch
1061: active side of axial compelling over running clutch
1062: passive side of axial compelling over running clutch
1063: middle rolling member
1071: active side of axial relay clutch
1072: axial clutch transmission block
1073: axial clutch transmission block recovering spring
1074: axial relay clutch transmission board
1075: middle rolling member
1076: passive side of axial relay clutch
1077: axial clutch structure
1079: transmission end
1081: active side of radial relay clutch
1082: radial clutch transmission block
1083: radial clutch transmission block recovering spring
1084: radial relay clutch transmission board
1085: middle rolling member
1086: passive side of radial relay clutch
1087: radial clutch structure
1089: transmission end

DETAILED DESCRIPTION OF THE PREFERRED EMBODIMENTS

Figure 2:
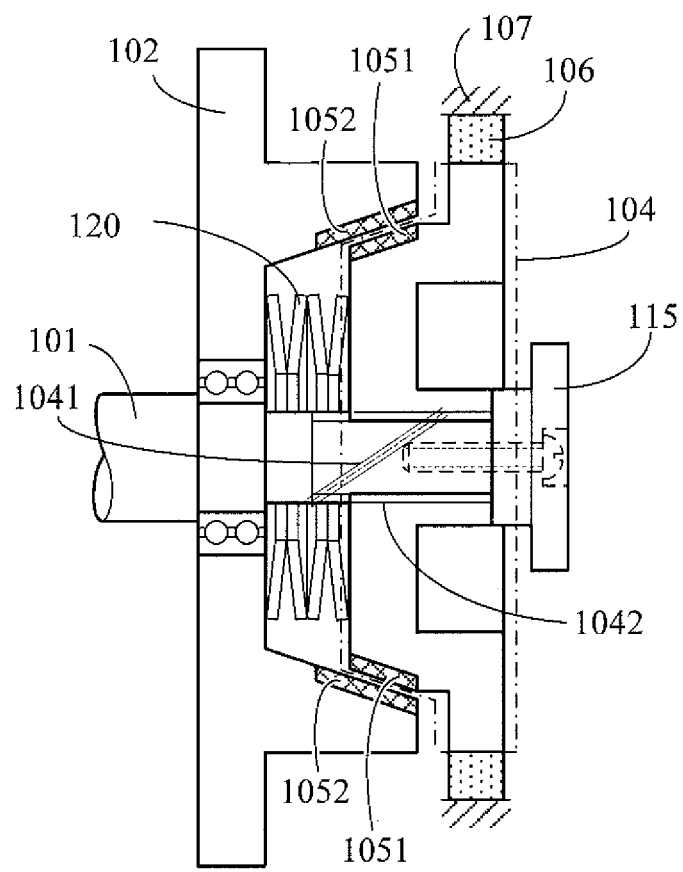
FIG. 2 is a schematic structural view of one embodiment illustrating that the relay coupling structure installed in the relay transmission structure assembly (104) is composed by the screw rod structure (1041) having axial actuation screw angle and the screw nut structure (1042) having axial actuation screw angle.

The present invention relates to a torque-actuated clutch, which is characterized in that being capable of controlling a clutch device to perform operations of coupling or disengaging with the driving torque, and being equipped with a relay transmission structure assembly (104) between a rotary prime motive end (101) and an output-end clutch structure (1052) installed at an output end (102), the relay transmission structure assembly (104) is installed with a relay coupling structure (204) having an active side of relay coupling structure and a passive side of relay coupling structure, the prime motive end (101) is provided with a limiting structure (115) for limiting relative positions of the relay transmission structure assembly (104) and the prime motive end (101);

a limit-torque sliding damping device (106) is installed between the relay transmission structure assembly (104) and the static housing (107) and is rotated in a first rotation direction at the prime motive end (101), so when the active side of relay coupling structure of the relay coupling structure (204) installed in the relay transmission structure assembly (104) is driven, a damping effect is generated by the limit-torque sliding damping device (106) installed between the relay transmission structure assembly (104) and the static housing (107) such that the passive side of relay output coupling structure is driven by the active side of relay coupling structure to move, and thereby to drive the relay transmission structure assembly (104) and a relay output clutch structure (1051) installed in the relay transmission structure assembly (104) to perform closing/opening operations with the output-end clutch structure (1052) installed at the output end (102) so as to transmit rotary kinetic energy, and to force a recovering actuation spring (120) provided between the relay output clutch structure (1051) and the output-end clutch structure (1052) being tightened;

when the rotary driving torque at the prime motive end (101) is no longer provided, through actions of the recovering actuation spring (120), the relay transmission structure assembly (104) is returned and the relay output clutch structure (1051) and the output-end clutch structure (1052) are separated, thereby the output end (102) is released;

FIG. 1 is a schematic view of the structural theory of the present invention;

As shown in FIG. 1, it mainly consists of:

a prime motive end (101): composed by a rotational mechanism for inputting rotary kinetic energy; the prime motive end (101) is served to drive an active side of relay coupling structure of a relay coupling structure (204) installed in a relay transmission structure assembly (104), the prime motive end (101) is installed with a limiting structure (115) for limiting relative positions of the relay transmission structure assembly (104) and the prime motive end (101);

an output end (102): composed by a rotational mechanism for outputting rotary kinetic energy; the output end (102) is connected to an output-end clutch structure (1052), and is controlled by the output-end clutch structure (1052);

a relay transmission structure assembly (104): the relay transmission structure assembly (104) is installed between the prime motive end (101) and the output end (102), and is capable of performing rotational drive and axial movement, the relay transmission structure assembly (104) is provided with a relay coupling structure (204) driven by the prime motive end (101), the relay coupling structure (204) has an active side of relay coupling structure and a passive side of relay coupling structure coaxially coupled and interacted with the active side, a limit-torque sliding damping device (106) is installed between the above mentioned transmission structure assembly (104) and the static housing (107), when the active side of the relay coupling structure is driven by the prime motive end (101), so as to apply the rotational driving torque to the passive side of relay coupling structure, a damping effect is generated by the limit-torque sliding damping device (106) installed between the relay transmission structure assembly (104) and the static housing (107) such that the passive side of relay coupling structure is driven to move, and the relay transmission structure assembly (104) generates a relative movement, so as to drive the relay output clutch structure (1051) installed in the relay transmission structure assembly (104) to perform closing/opening operations with an output-end clutch structure (1052) for transmitting rotary kinetic energy, and a recovering actuation spring (120) is then forced being tightened; when the rotational driving torque from the prime motive end (101) to the output end (102) is no longer provided, the relay output clutch structure (1051) and the output-end clutch structure (1052) are separated and the passive side of relay coupling structure is returned through a release recovering effect provided by the recovering actuation spring (120), thereby to terminate the transmission of the rotary kinetic energy;

a limit-torque sliding damping device (106): composed by a mechanism device having limit-torque sliding damping effect with a restraining function while relative rotational movements are generated between the relay transmission structure assembly (104) and the static housing (107); and is installed between the relay transmission structure assembly (104) and the static housing (107), so through the limit-torque sliding damping device (106), relative movements are generated between the active side of relay coupling structure and the passive side of relay coupling structure combined in the relay transmission structure assembly (104) when the active side of relay coupling structure is driven by the prime motive end (101) to perform rotational drive;

the structure includes: constituted by the mechanism device, which is through the mechanical force, the spring pre-stressing force, the electromagnetic force of electric excited coil, or the action force of permanent magnet for the limit-torque sliding damping device (106) including between solid and solid, or between solid and viscous fluid, or between viscous fluid and viscous fluid, or between solid and gaseous or liquidity fluids to generate sliding damping;

a static housing (107): configured by a static housing structure for accommodating the torque-actuated clutch;

a limiting structure (115): composed by a mechanism capable of limiting relative positions of the relay transmission structure assembly (104) and the prime motive end (101), and is combined with the rotary part of the prime motive end (101);

a recovering actuation spring (120): which is a spring device capable of being pressed for storing energy and being released for outputting energy, and disposed between the relay output clutch structure (1051) and the output-end clutch structure (1052), and the normal state thereof is to separate the relay output clutch structure (1051) and the output-end clutch structure (1052), so as to terminate the transmission of the rotary kinetic energy; when the relay output clutch structure (1051) and the output-end clutch structure (1052) are driven so as to be engaged, the recovering actuation spring (120) is synchronously pre-pressed for being in an energy-storing state;

a relay output clutch structure (1051): the relay output clutch structure (1051) is composed by a clutch function structure and is installed in the relay transmission structure assembly (104), when the active side of relay coupling structure is driven by the prime motive end (101), the relay output clutch structure (1051) and the relay transmission structure assembly (104) are driven by the active side of relay coupling structure of the relay coupling structure (204), for performing closing/opening operations with the output-end clutch structure (1052) so as to transmit rotary kinetic energy, when the driving force from the prime motive end (101) to the output end (102) is no longer provided, the relay output clutch structure (1051) and the output-end clutch structure (1052) are disengaged through the releasing elastic force of the recovering actuation spring (120), thereby terminating the transmission of the rotary kinetic energy;

an output-end clutch structure (1052): composed by a clutch function structure capable of performing closing/opening operations with the relay output clutch structure (1051) to transmit rotary kinetic energy, or being disengaged for terminating the transmission of the rotary kinetic energy, and the output-end clutch structure (1052) is connected to the output end (102);

the clutch structure of the relay output clutch structure (1051) and the output-end clutch structure (1052) consists of the friction-type clutch structure, the engaging-type clutch structure or the synchro-engaging clutch structure;

In the clutch actuated by torque of the present invention, the relay coupling structure (204) installed in the relay transmission structure assembly (104) can be further composed by a screw rod structure (1041) and a screw nut structure (1042);

FIG. 2 is a schematic structural view of one embodiment illustrating that the relay coupling structure installed in the relay transmission structure assembly (104) is composed by the screw rod structure (1041) having axial actuation screw angle and the screw nut structure (1042) having axial actuation screw angle.

Figure 3:
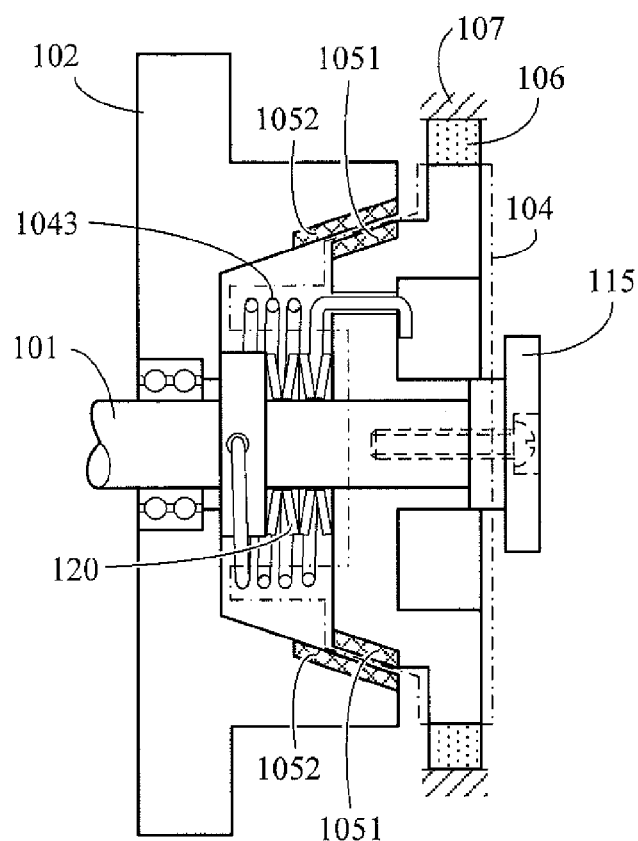
FIG. 3 is a schematic structural view of one embodiment illustrating that the relay coupling structure installed in the relay transmission structure assembly (104) is composed by the coil-shaped spring capable of rotating for axial actuation (1043).

As shown in FIG. 2, it mainly consists of:

a prime motive end (101): composed by a rotational mechanism for inputting the rotary kinetic energy; the prime motive end (101) is a screw rod structure (1041), having the function of the active end of relay coupling structure, for driving the relay transmission structure assembly (104); the prime motive end (101) is installed with a limiting structure (115) for limiting relative positions of the relay transmission structure assembly (104) and the prime motive end (101);

an output end (102): composed by a rotational mechanism for outputting the rotary kinetic energy; the output end (102) is connected to an output-end clutch structure (1052), and is controlled by the output-end clutch structure (1052);

a relay transmission structure assembly (104): the relay transmission structure assembly (104) is installed between the prime motive end (101) and the output end (102), and is capable of performing rotational driving and axial movement, the relay transmission structure assembly (104) is installed with a relay coupling structure driven by the prime motive end (101), the relay coupling structure has a function of the active side of relay coupling structure composed by the screw rod structure (1041) and a function of the passive side of relay coupling structure composed by the screw nut structure (1042), the screw rod structure (1041) and the screw nut structure (1042) are coaxially coupled and interacted, the above mentioned passive side of relay coupling structure composed by the screw nut structure (1042) is connected to the relay transmission structure assembly (104), a limit-torque sliding damping device (106) is installed between the relay transmission structure assembly (104) and the static housing (107), when the screw rod structure (1041) is driven by the prime motive end (101), so as to apply a rotational driving torque to the screw nut structure (1042), through a damping effect generated by the limit-torque sliding damping device (106) installed between the relay transmission structure assembly (104) and the static housing (107), the relay transmission structure assembly (104) connected with the screw nut structure (1042) generates a relative axial movement for driving the relay output clutch structure (1051) installed in the relay transmission structure assembly (104) to perform closing/opening operations with the output-end clutch structure (1052) for transmitting rotary kinetic energy, and the recovering actuation spring (120) is then forced being tightened;

when the rotational driving torque from the prime motive end (101) to the output end (102) is no longer provided, the relay output clutch structure (1051) and the output-end clutch structure (1052) are separated and the screw nut structure (1042) is returned, thereby terminating the transmission of the rotary kinetic energy;

a limit-torque sliding damping device (106): composed by a mechanism device having limit-torque sliding damping effect with a restraining function while relative rotational movements are generated between the relay transmission structure assembly (104) and the static housing (107); and is installed between the relay transmission structure assembly (104) and the static housing (107); so when the screw rod structure (1041) is driven by the prime motive end (101) to perform rotational driving, through actions of the limit-torque sliding damping device (106), relative movements are generated between the screw rod structure (1041) and the screw nut structure (1042) combined in the relay transmission structure assembly (104) during the screw rod structure (1041) performing rotational driving to the screw nut structure (1042);

the structure includes: constituted by the mechanism device, which is through the mechanical force, the spring pre-stressing force, the electromagnetic force of electric excited coil, or the action force of permanent magnet for the limit-torque sliding damping device (106) including between solid and solid, or between solid and viscous fluid, or between viscous fluid and viscous fluid, or between solid and gaseous or liquidity fluids to generate sliding damping;

a static housing (107): configured by a static housing structure for accommodating the torque-actuated clutch;

a limiting structure (115): composed by a mechanism capable of limiting relative positions of the relay transmission structure assembly (104) and the prime motive end (101), and is combined with the rotary part of the prime motive end (101);

a recovering actuation spring (120): which is a spring device capable of being pressed for storing energy and being released for outputting energy, and disposed between the relay output clutch structure (1051) and the output-end clutch structure (1052), and the normal state thereof is to separate the relay output clutch structure (1051) and the output-end clutch structure (1052), so as to terminate the transmission of the rotary kinetic energy; when the relay output clutch structure (1051) and the output-end clutch structure (1052) are driven so as to be engaged, the recovering actuation spring (120) is synchronously pre-pressed for being in an energy-storing state;

a relay output clutch structure (1051): the relay output clutch structure (1051) is composed by a clutch function structure and is installed in the relay transmission structure assembly (104), when the screw rod structure (1041) is driven by the prime motive end (101), the relay output clutch structure (1051) and the relay transmission structure assembly (104) are driven by the screw rod structure (1041) of the relay coupling structure, for performing closing/opening operations with the output-end clutch structure (1052) so as to transmit rotary kinetic energy and to force the recovering actuation spring (120) being tightened; when the rotational driving torque from the prime motive end (101) to the output end (102) is no longer provided, the relay output clutch structure (1051) and the output-end clutch structure (1052) are disengaged through the releasing elastic force of the recovering actuation spring (120), thereby terminating the transmission of the rotary kinetic energy;

an out-put end clutch structure (1052): composed by a clutch function structure capable of performing closing/opening operations with the relay output clutch structure (1051) to transmit rotary kinetic energy, or being disengaged for terminating the transmission of the rotary kinetic energy, and the output-end clutch structure (1052) is connected to the output end (102);

the clutch structure of the relay output clutch structure (1051) and the output-end clutch structure (1052) consists of the friction-type clutch structure, the engaging-type clutch structure or the synchro-engaging clutch structure;

In the clutch actuated by torque of the present invention, the relay coupling structure installed in the relay transmission structure assembly (104) can be further composed by a coil-shaped spring capable of rotating for axial actuation (1043);

FIG. 3 is a schematic structural view of one embodiment illustrating that the relay coupling structure installed in the relay transmission structure assembly (104) is composed by the coil-shaped spring capable of rotating for axial actuation (1043).

Figure 4:
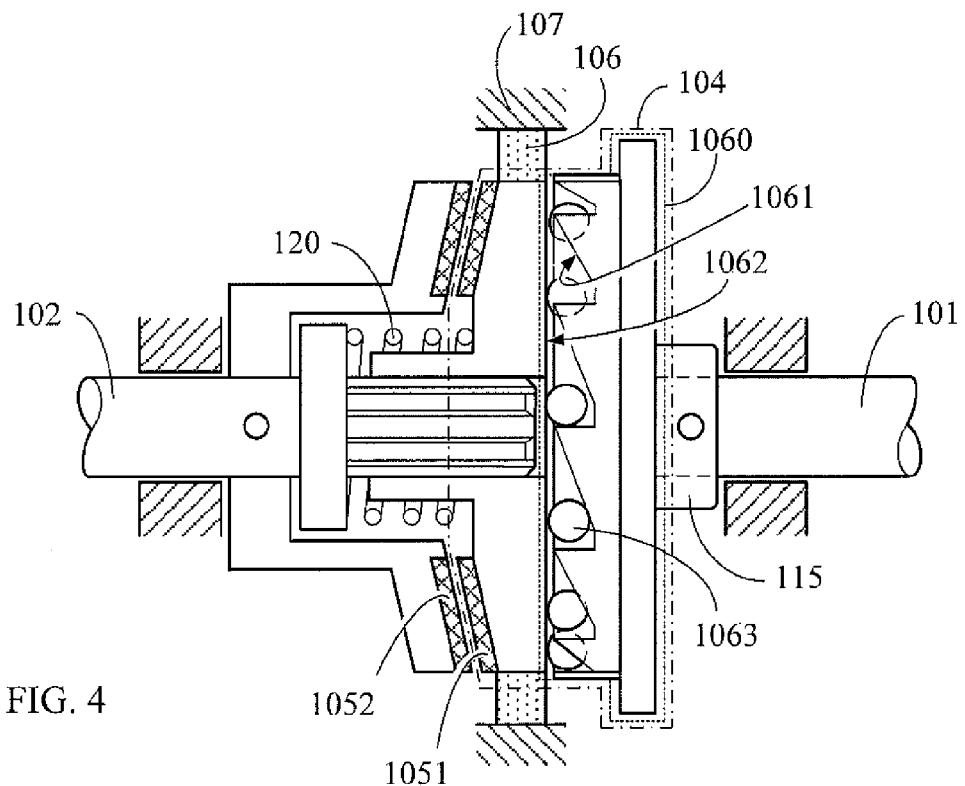
FIG. 4 is a schematic structural view of one embodiment illustrating that the relay coupling structure installed in the relay transmission structure assembly (104) is composed by the axial compelling over running clutch.

As shown in FIG. 3, it main consists of:

a prime motive end (101): composed by a rotational mechanism for inputting rotary kinetic energy; the prime motive end (101) is a coil-shaped spring capable of rotating for axial actuation (1043) for driving the relay transmission structure assembly (104), the prime motive end (101) is installed with a limiting structure (115) for limiting relative positions of the relay transmission structure assembly (104) and the prime motive end (101);

an output end (102): composed by a rotational mechanism for outputting rotary kinetic energy; the output end (102) is connected to an output-end clutch structure (1052), and is controlled by the output-end clutch structure (1052);

a relay transmission structure assembly (104): the relay transmission structure assembly (104) is installed between the prime motive end (101) and the output end (102), and is capable of performing rotational driving and axial movement, the relay transmission structure assembly (104) is installed with a coil-shaped spring capable of rotating for axial actuation (1043) serving to provide the function of relay coupling structure and is coaxially shaft-installed between the relay transmission structure assembly (104) and the prime motive end (101), one end of the coil-shaped spring capable of rotating for axial actuation (1043) is fastened at the prime motive end (101) for providing the function of the active side of relay coupling structure, the other end of the coil-shaped spring capable of rotating for axial actuation (1043) is installed with the relay transmission structure assembly (104) for providing the function of the passive side of relay coupling structure, a limit-torque sliding damping device (106) is installed between the relay transmission structure assembly (104) and the static housing (107); when the coil-shaped spring capable of rotating for axial actuation (1043) is processed with a tighten operation of angular displacement drive at the prime motive end (101), through a damping effect generated by the limit-torque sliding damping device (106) installed between the relay transmission structure assembly (104) and the static housing (107), the coil-shaped spring capable of rotating for axial actuation (1043) generates an axial actuation force, so the relay transmission structure assembly (104) generates a relative axial movement, such that the relay output clutch structure (1051) installed in the relay transmission structure assembly (104) is driven to perform closing/opening operations with the output-end clutch structure (1052) so as to transmit rotary kinetic energy, and to force the recovering actuation spring (120) being tightened; when the rotational driving torque from the prime motive end (101) to the output end (102) is no longer provided, the relay output clutch structure (1051) and the output-end clutch structure (1052) are separated through the releasing recovering force of the recovering actuation spring (120) and the coil-shaped spring capable of rotating for axial actuation (1043) is returned, thereby terminating the transmission of the rotary kinetic energy;

a limit-torque sliding damping device (106): composed by a mechanism device having limit-torque sliding damping effect with a restraining function while relative rotational movements are generated between the relay transmission structure assembly (104) and the static housing (107); and is installed between the relay transmission structure assembly (104) and the static housing (107); when the coil-shaped spring capable of rotating for axial actuation (1043) is applied with an angular displacement driving force by the prime motive end (101), through actions of the limit-torque sliding damping device (106), the relay transmission structure assembly (104) generates relative movements;

the structure includes: constituted by the mechanism device, which is through the mechanical force, the spring pre-stressing force, the electromagnetic force of electric excited coil, or the action force of permanent magnet for the limit-torque sliding damping device (106) including between solid and solid, or between solid and viscous fluid, or between viscous fluid and viscous fluid, or between solid and gaseous or liquidity fluids to generate sliding damping;

a static housing (107): configured by a static housing structure for accommodating the torque-actuated clutch;

a limiting structure (115): composed by a mechanism capable of limiting relative positions of the relay transmission structure assembly (104) and the prime motive end (101), and is combined with the rotary part of the prime motive end (101);

a recovering actuation spring (120): which is a spring device capable of being pressed for storing energy and being released for outputting energy, and disposed between the relay output clutch structure (1051) and the output-end clutch structure (1052), and the normal state thereof is to separate the relay output clutch structure (1051) and the output-end clutch structure (1052), so as to terminate the transmission of the rotary kinetic energy; when the relay output clutch structure (1051) and the output-end clutch structure (1052) are driven so as to be engaged, the recovering actuation spring (120) is synchronously pre-pressed for being in an energy-storing state;

relay output clutch structure (1051): the relay output clutch structure (1051) is composed by a clutch function structure and is installed in the relay transmission structure assembly (104), when the coil-shaped spring capable of rotating for axial actuation (1043) is driven at the prime motive end (101), the relay output clutch structure (1051) and the relay transmission structure assembly (104) are driven by the coil-shaped spring capable of rotating for axial actuation (1043) having the relay coupling structure function and installed between the relay transmission structure assembly (104) and the prime motive end (101), so as to perform closing/opening operations with the output-end clutch structure (1052) for transmitting rotary kinetic energy and forcing the recovering actuation spring (120) being tightened; when the rotational driving torque from the prime motive end (101) to the output end (102) is no longer provided, the relay output clutch structure (1051) and the output-end clutch structure (1052) are disengaged and the coil-shaped spring capable of rotating for axial actuation (1043) is returned through the releasing elastic force of the recovering actuation spring (120), thereby terminating the transmission of the rotary kinetic energy;

an out-put end clutch structure (1052): composed by a clutch function structure capable of performing closing/opening operations with the relay output clutch structure (1051) to transmit rotary kinetic energy, or being disengaged for terminating the transmission of the rotary kinetic energy, and the output-end clutch structure (1052) is connected to the output end (102);

the clutch structure of the relay output clutch structure (1051) and the output-end clutch structure (1052) consists of the friction-type clutch structure, the engaging-type clutch structure or the synchro-engaging clutch structure;

In the clutch actuated by torque of the present invention, the relay coupling structure installed in the relay transmission structure assembly (104) can be further composed by an axial compelling over running clutch;

FIG. 4 is a schematic structural view of one embodiment illustrating that the relay coupling structure installed in the relay transmission structure assembly (104) is composed by the axial compelling over running clutch.

As shown in FIG. 4, it mainly consists of:

a prime motive end (101): composed by a rotational mechanism for inputting rotary kinetic energy; the prime motive end (101) is an active side of axial compelling over running clutch (1061), having the function of the active side of relay input coupling structure, for driving the relay transmission structure assembly (104), the prime motive end (101) is installed with a limiting structure (115) for limiting relative positions of the relay transmission structure assembly (104) and the prime motive end (101);

an output end (102): composed by a rotational mechanism for outputting rotary kinetic energy; the output end (102) is connected to an output-end clutch structure (1052), and is controlled by the output-end clutch structure (1052);

a relay transmission structure assembly (104): the relay transmission structure assembly (104) is installed between the prime motive end (101) and the output end (102), the relay transmission structure assembly (104) is installed with an axial compelling over running clutch (1060) having the function of the relay coupling structure, the axial compelling over running clutch (1060) is equipped with an active side of axial compelling over running clutch (1061) and a passive side of axial compelling over running clutch (1062) and middle rolling members (1063), a plurality of saw-shaped intervals are formed between the active side of axial compelling over running clutch (1061) and the passive side of axial compelling over running clutch (1062) for accommodating the middle rolling members (1063) so as to constitute the over running clutch function; a limit-torque sliding damping device (106) is installed between the relay transmission structure assembly (104) and the static housing (107), when the axial compelling over running clutch (1060) is driven by the prime motive end (101), through a damping effect generated by the limit-torque sliding damping device (106) installed between the relay transmission structure assembly (104) and the static housing (107), the active side of axial compelling over running clutch (1061) applies rotational driving torque to the passive side of axial compelling over running clutch (1062) via the middle running members (1063); before the middle rolling members (1063) are forced to be latched between the active side of axial compelling over running clutch (1061) and the passive side of axial compelling over running clutch (1062), the passive side of axial compelling over running clutch (1062) is compelled to be moved axially, so the relay transmission structure assembly (104) installed with the axial compelling over running clutch (1060) generates a relative movement for driving the relay output clutch structure (1051) installed in the relay transmission structure assembly (104) and the output-end clutch structure (1052) to perform opening/closing operations and to force the recovering actuation spring (120) being tightened; when the rotational driving torque from the prime motive end (101) to the output end (102) is no longer provided, the relay output clutch structure (1051) and the output-end clutch structure (1052) are disengaged through the releasing recovering force of the recovering actuation spring (120) and the passive side of axial compelling over running clutch (1062) is returned, thereby terminating the transmission of the rotary kinetic energy;

a limit-torque sliding damping device (106): composed by a mechanism device having limit-torque sliding damping effect with a restraining function while relative rotational movements are generated between the relay transmission structure assembly (104) and the static housing (107); and is installed between the relay transmission structure assembly (104) and the static housing (107), when the active side of axial compelling over running clutch (1061) is driven by the prime motive end (101) to perform rotational driving, through actions of the limit-torque sliding damping device (106), relative movements are generated between the active side of axial compelling over running clutch (1061) and the passive side of axial compelling over running clutch (1062);

the structure includes: constituted by the mechanism device, which is through the mechanical force, the spring pre-stressing force, the electromagnetic force of electric excited coil, or the action force of permanent magnet for the limit-torque sliding damping device (106) including between solid and solid, or between solid and viscous fluid, or between viscous fluid and viscous fluid, or between solid and gaseous or liquidity fluids to generate sliding damping;

a static housing (107): configured by a static housing structure for accommodating the torque-actuated clutch;

a limiting structure (115): composed by a mechanism capable of limiting relative positions of the relay transmission structure assembly (104) and the prime motive end (101), and is combined with the rotary part of the prime motive end (101);

a recovering actuation spring (120): which is a spring device capable of being pressed for storing energy and being released for outputting energy, and disposed between the relay output clutch structure (1051) and the output-end clutch structure (1052), and the normal state thereof is to separate the relay output clutch structure (1051) and the output-end clutch structure (1052), so as to terminate the transmission of the rotary kinetic energy; when the relay output clutch structure (1051) and the output-end clutch structure (1052) are driven so as to be engaged, the recovering actuation spring (120) is synchronously pre-pressed for being in an energy-storing state;

a relay output clutch structure (1051): the relay output clutch structure (1051) is composed by a clutch function structure and is installed in the relay transmission structure assembly (104), when the active side of axial compelling over running clutch (1061) is driven by the prime motive end (101), the passive side of axial compelling over running clutch (1062) installed in the relay transmission structure assembly (104) is axially driven so as to drive the relay transmission structure assembly (104) and the relay output clutch structure (1051) installed in the relay transmission structure assembly (104) for performing opening/closing operations with the output-end clutch structure (1052) for transmitting rotary kinetic energy and forcing the recovering actuation spring (120) be tightened; when the rotational driving torque from the prime motive end (101) to the output end (102) is no longer provided, the relay output clutch structure (1051) and the output-end clutch structure (1052) are disengaged and the passive side of axial compelling over running clutch (1062) is returned through the releasing elastic force of the recovering actuation spring (120), thereby terminating the transmission of the rotary kinetic energy;

an out-put end clutch structure (1052): composed by a clutch function structure capable of performing closing/opening operations with the relay output clutch structure (1051) to transmit rotary kinetic energy, or being disengaged for terminating the transmission of the rotary kinetic energy, and the output-end clutch structure (1052) is connected to the output end (102);

the clutch structure of the relay output clutch structure (1051) and the output-end clutch structure (1052) consists of the friction-type clutch structure, the engaging-type clutch structure or the synchro-engaging clutch structure;

In the clutch actuated by torque of the present invention, the relay coupling structure installed in the relay transmission structure assembly (104) can be further composed by the axial relay clutch of the axial clutch transmission block having axial compelling pre-forces recovering.

Figure 5:
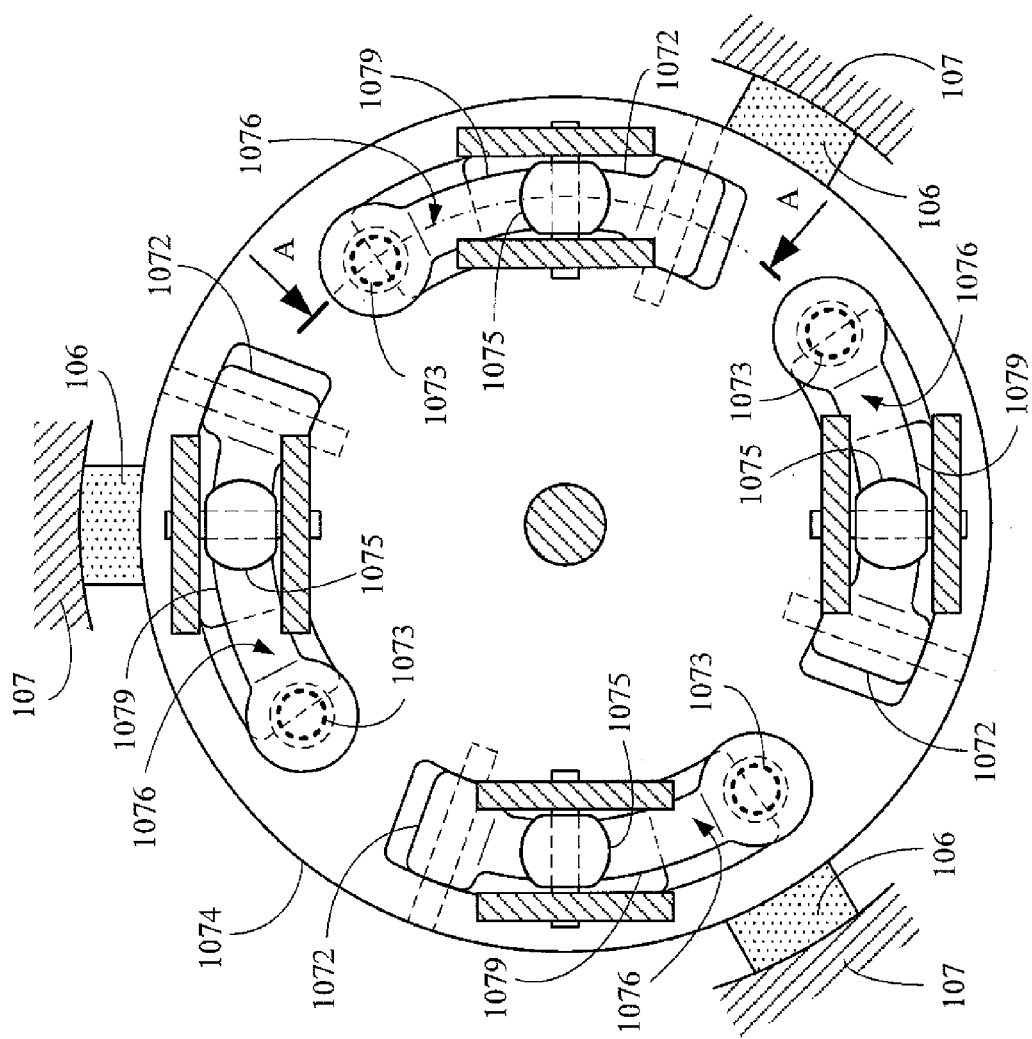
FIG. 5 is a schematic structural view of one embodiment illustrating that the relay coupling structure installed in the relay transmission structure assembly (104) is composed by the axial relay clutch of the axial clutch transmission block having axial compelling pre-forced recovering.

FIG. 5 is a structural schematic view of one embodiment illustrating that the relay coupling structure installed in the relay transmission structure assembly (104) is composed by the axial relay clutch of the axial clutch transmission block having axial compelling pre-forced recovering.

Figure 6:
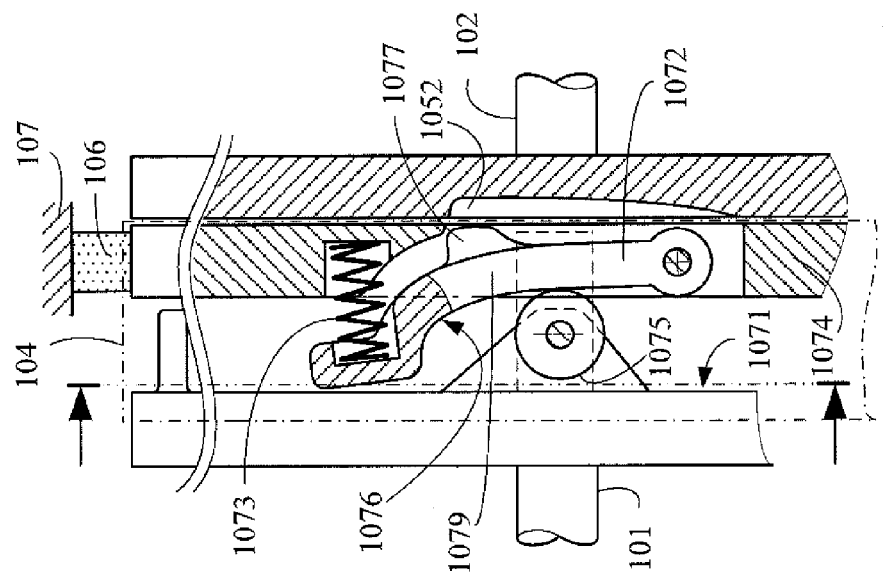
FIG. 6 is a cross sectional view of FIG. 5 intersected along an A-A line.

As shown in FIG. 5, it mainly consists of:

a prime motive end (101): composed by a rotational mechanism for inputting the rotary kinetic energy; the prime motive end (101) is an axial relay clutch, having the function of relay coupling structure, for driving the relay transmission structure assembly (104);

an output end (102): composed by a rotational mechanism for outputting the rotary kinetic energy; the output end (102) is connected to an output-end clutch structure (1052), and is controlled by the output-end clutch structure (1052);

a relay transmission structure assembly (104): the relay transmission structure assembly (104) is installed between the prime motive end (101) and the output end (102), the relay transmission structure assembly (104) has an axial relay clutch, which mainly consists of an active side of axial relay clutch (1071), an axial clutch transmission block (1072), an axial clutch transmission block recovering spring (1073), an axial relay clutch transmission board (1074), and a middle rolling member (1075); wherein the active side of axial relay clutch (1071) accommodating the middle rolling member (1075) is driven by the prime motive end (101), the middle rolling member (1075) is coupled to a passive side of axial relay clutch (1076) which is an obliquely compelled surface with respect to the axial clutch transmission block (1072), the axial clutch transmission block (1072) is installed on the axial relay clutch transmission board (1074), a limit-torque sliding damping device (106) is installed between the axial relay clutch transmission board (1074) and the static housing (107), one end of the axial clutch transmission block (1072) is fastened on the axial relay clutch transmission board (1074), the other end of the axial clutch transmission block (1072) is served as a transmission end (1079), the passive side of axial relay clutch (1076) of the transmission end (1079) is an obliquely compelled surface allowing the middle rolling member (1075) to be coupled, the other surface of the transmission end (1079) is served as an axial clutch structure (1077), when the active side of axial relay clutch (1071) equipped with the middle rolling member (1075) is applied with rotational driving torque by the prime motive end (101), through a damping effect generated by the limit-torque sliding damping device (106) installed between the relay transmission structure assembly (104) and the static housing (107), the passive side of axial relay clutch (1076) which is an obliquely compelled surface with respect to the axial clutch transmission block (1072) is compelled to move by the middle rolling member (1075) installed at the active side of axial relay clutch (1071), and the axial clutch structure (1077) is moved to be coupled with the output-end clutch structure (1052) of the output end (102) for transferring rotary kinetic energy, when the rotational driving torque from the prime motive end (101) to the output end (102) is no longer provided, through the elasticity of the axial clutch transmission block (1072) and/or the releasing recovering force of the axial clutch transmission block recovering spring (1073) installed between the axial relay clutch transmission board (1074) and the middle rolling member (1075), such that the axial clutch structure (1077) of the axial clutch transmission block (1072) and the output-end clutch structure (1052) of the output end (102) are disengaged, and the axial relay clutch transmission board (1074) is returned, thereby terminating the transmission of the rotary kinetic energy;

a limit-torque sliding damping device (106): composed by a mechanism device having limit-torque sliding damping effect with a restraining function while relative rotational movements are generated between the axial relay clutch transmission board (1074) and the static housing (107), and is installed between the static housing (107) and the axial relay clutch transmission board (1074), when the active side of axial relay clutch (1071) is rotationally driven by the prime motive end (101), through actions of the limit-torque sliding damping device (106), the active side of axial relay clutch (1071) performs rotational driving to the axial relay clutch transmission board (1074), the axial clutch transmission block (1072) and the axial clutch structure (1077) installed at the axial relay clutch transmission board (1074) are compelled to move by the middle rolling member (1075) driven by the active side of axial relay clutch (1071), thereby to generate relative movements;

the structure includes: constituted by the mechanism device, which is through the mechanical force, the spring pre-stressing force, the electromagnetic force of electric excited coil, or the action force of permanent magnet for the limit-torque sliding damping device (106) including between solid and solid, or between solid and viscous fluid, or between viscous fluid and viscous fluid, or between solid and gaseous or liquidity fluids to generate sliding damping;

a static housing (107): configured by a static housing structure for accommodating the torque-actuated clutch;

an output-end clutch structure (1052): the output-end clutch structure (1052) is composed by a clutch function structure and is connected to the output end (102) being served to perform opening/closing operations for transferring rotary kinetic energy with the axial clutch structure (1077) of the transmission end (1079) of the axial clutch transmission block (1072) of the axial relay clutch transmission board (1074), or in a disengaged state for terminating the transmission of the rotary kinetic energy;

the clutch structure of the axial clutch structure (1077) and the output-end clutch structure (1052) consists of the friction-type clutch structure, the engaging-type clutch structure or the synchro-engaging clutch structure;

a middle rolling member (1075): which can be replaced by rolling balls, cone-shaped cylinders, or spherical or arc-shaped protrusions;

In the clutch actuated by torque of the present invention, the relay output coupling structure installed in the relay transmission structure assembly (104) can be further composed by a radial relay clutch of the radial clutch transmission block having radial compelling pre-forced recovering;

FIG. 6 is a cross sectional view of FIG. 5 intersected along an A-A line.

Figure 7:
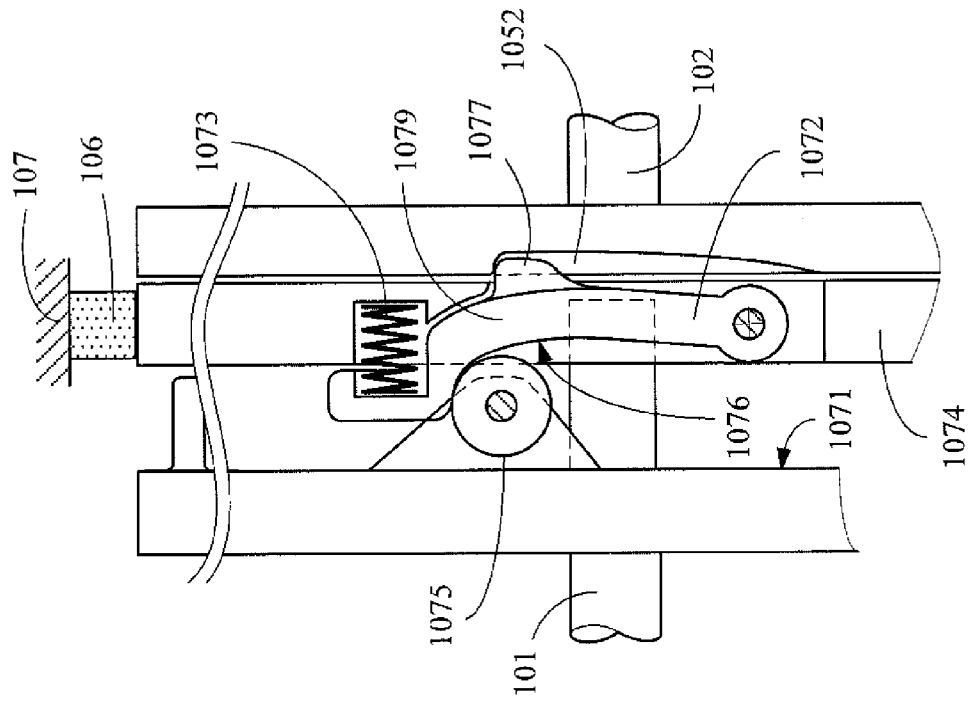
FIG. 7 is a schematic view illustrating the disengaged state of the axial clutch structure (1077) and the output-end clutch structure (1052) as shown in FIG. 5.

FIG. 7 is a schematic view illustrating the disengaged state of the axial clutch structure (1077) and the output-end clutch structure (1052) as shown in FIG. 5.

Figure 8:
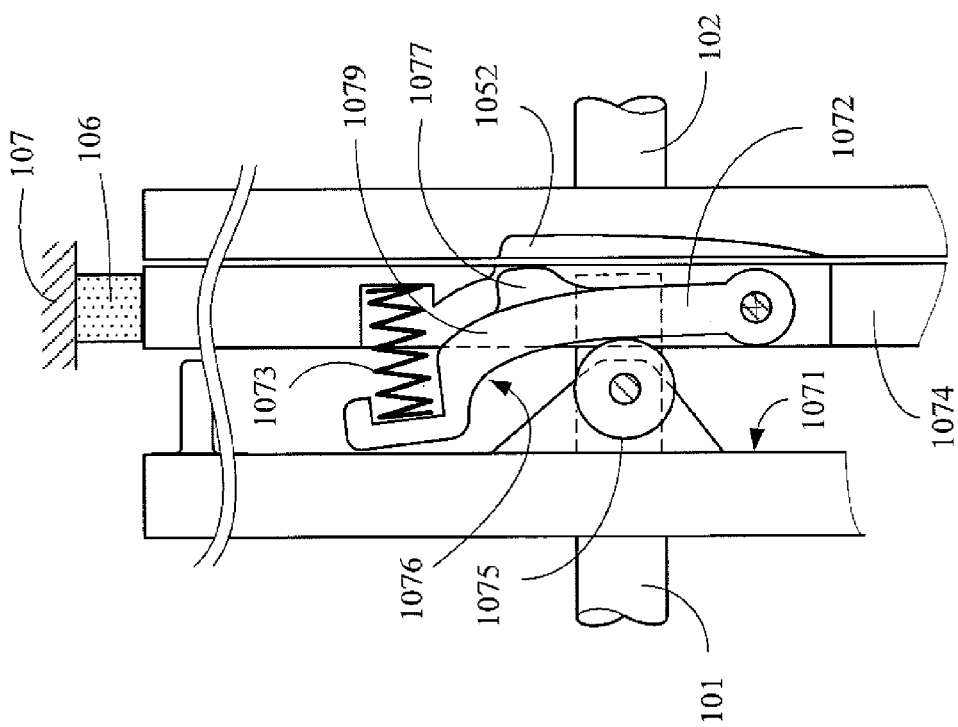
FIG. 8 is a schematic view illustrating the engaged state of the axial clutch structure (1077) and the output-end clutch structure (1052) as shown in FIG. 5.

FIG. 8 is a schematic view illustrating the engaged state of the axial clutch structure (1077) and the output-end clutch structure (1052) as shown in FIG. 5.

Figure 9:
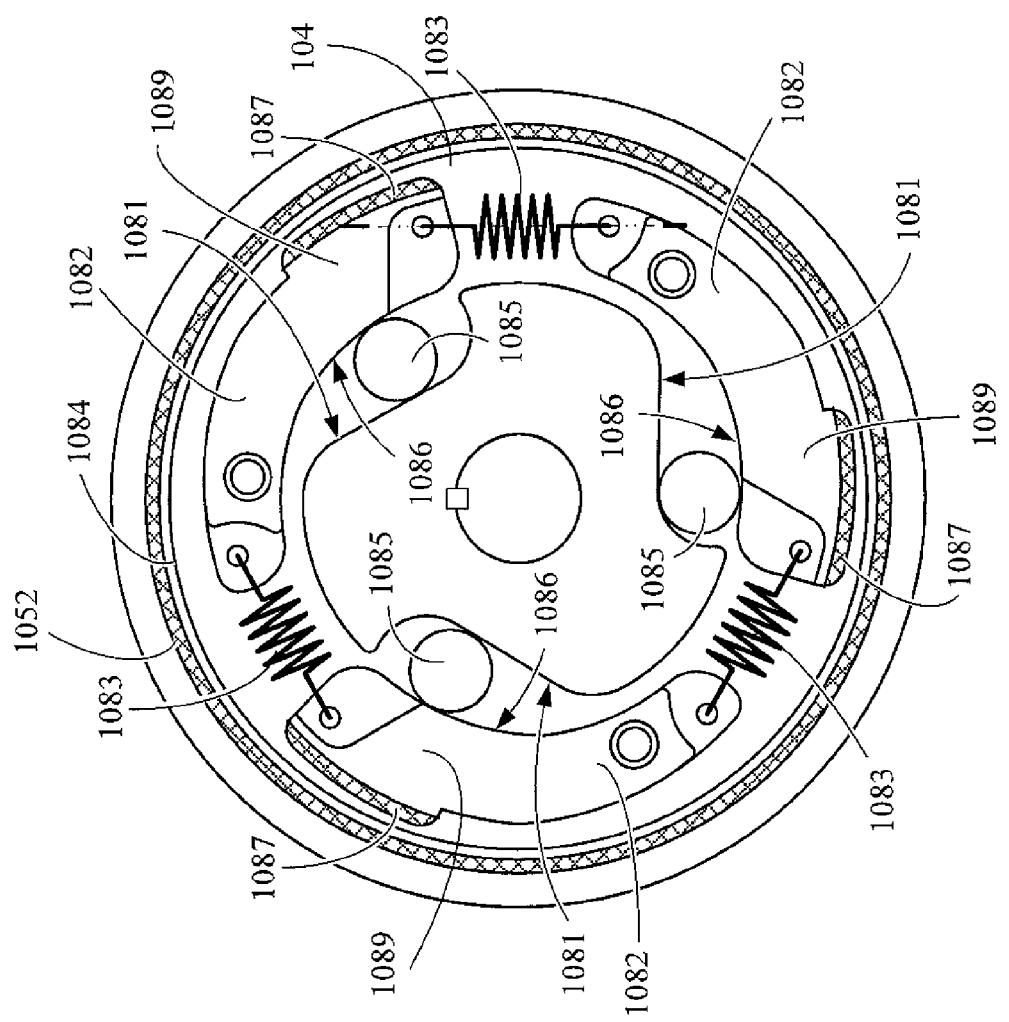
FIG. 9 is a schematic structural view of one embodiment illustrating that the relay coupling structure and the relay outputting structure installed in the relay transmission structure assembly (104) is composed by the radial relay clutch of the radial clutch transmission block having radial compelling pre-forced recovering.

FIG. 9 is a schematic structural view of one embodiment illustrating that the relay coupling structure and the relay outputting structure installed in the relay transmission structure assembly (104) is composed by the radial relay clutch of the radial clutch transmission block having radial compelling pre-forced recovering.

Figure 10:
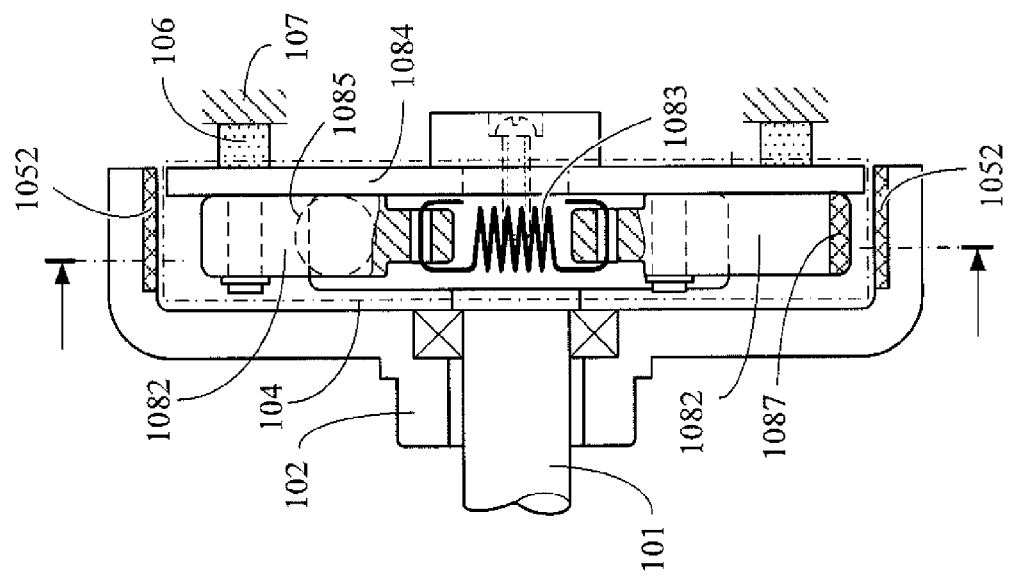
FIG. 10 is a cross sectional view of FIG. 9.

As shown in FIG. 9, it mainly consists of:

a prime motive end (101): composed by a rotational mechanism for inputting rotary kinetic energy; the prime motive end (101) is a radial relay clutch, having the function of relay coupling structure, for driving the relay transmission structure assembly (104);

an output end (102): composed by a rotational mechanism for outputting rotary kinetic energy; the annular interior of the output end (102) is installed with an output-end clutch structure (1052), and is controlled by the output-end clutch structure (1052);

a relay transmission structure assembly (104): the relay transmission structure assembly (104) is installed between the prime motive end (101) and the output end (102), the three components are arranged as a concentric annular structure, the relay transmission structure assembly (104) is equipped with a radial relay clutch which mainly consists of an active side of radial relay clutch (1081), a radial clutch transmission block (1082), a radial clutch transmission block recovering spring (1083), a radial relay clutch transmission board (1084), and a middle rolling member (1085); wherein the active side of radial relay clutch (1081) accommodating the middle rolling member (1085) is driven by the prime motive end (101), the middle rolling member (1085) is coupled to a passive side of radial relay clutch (1086) which is an obliquely compelled surface with respect to the radial clutch transmission block (1082), the radial clutch transmission block (1082) is installed on the radial relay clutch transmission board (1084), a limit-torque sliding damping device (106) is installed between the radial relay clutch transmission board (1084) and the static housing (107), one end of the radial clutch transmission block (1082) is fastened on the radial relay clutch transmission board (1084), the other end of the radial clutch transmission block (1082) is served as a transmission end (1089), the passive side of radial relay clutch (1086) of the transmission end (1089) is an obliquely compelled surface allowing the middle rolling member (1085) to be coupled, the other surface of the transmission end (1089) is served as a radial clutch structure (1087), when the active side of radial relay clutch (1081) equipped with the middle rolling member (1085) is applied with rotational driving torque by the prime motive end (101), through a damping effect generated by the limit-torque sliding damping device (106) installed between the relay transmission structure assembly (104) and the static housing (107), the passive side of radial relay clutch (1086) which is an obliquely compelled surface with respect to the radial clutch transmission block (1082) is compelled to move by the middle rolling member (1085) installed at the active side of radial relay clutch (1081), and the radial clutch structure (1087) is moved to be coupled with the output-end clutch structure (1052) of the output end (102) for transferring rotary kinetic energy, when the rotational driving torque from the prime motive end (101) to the output end (102) is no longer provided, through the elasticity of the radial clutch transmission block (1082) and/or the releasing recovering force of the radial clutch transmission block recovering spring (1083) installed between the radial relay clutch transmission board (1084) and the middle rolling member (1085), such that the radial clutch structure (1087) of the radial clutch transmission block (1082) and the output-end clutch structure (1052) of the output end (102) are disengaged, and the radial relay clutch transmission board (1084) is returned, thereby terminating the transmission of the rotary kinetic energy;

a limit-torque sliding damping device (106): composed by a mechanism device having limit-torque sliding damping effect with a restraining function while relative rotational movements are generated between the radial relay clutch transmission board (1084) and the static housing (107), and is installed between the static housing (107) and the radial relay clutch transmission board (1084), when the active side of radial relay clutch (1081) is rotationally driven by the prime motive end (101), through actions of the limit-torque sliding damping device (106), the active side of radial relay clutch (1081) performs rotational driving to the radial relay clutch transmission board (1084), the radial clutch transmission block (1082) and the radial clutch structure (1087) installed at the radial relay clutch transmission board (1084) are compelled to move by the middle rolling member (1085) driven by the active side of radial relay clutch (1081), thereby to generate relative movements;

the structure includes: constituted by the mechanism device, which is through the mechanical force, the spring pre-stressing force, the electromagnetic force of electric excited coil, or the action force of permanent magnet for the limit-torque sliding damping device (106) including between solid and solid, or between solid and viscous fluid, or between viscous fluid and viscous fluid, or between solid and gaseous or liquidity fluids to generate sliding damping;

a static housing (107): configured by a static housing structure for accommodating the torque-actuated clutch;

an output-end clutch structure (1052): the output-end clutch structure (1052) is composed by a clutch function structure and is connected to the output end (102)

being served to perform opening/closing operations for transferring rotary kinetic energy with the radial clutch structure (1087) of the transmission end (1089) of the radial clutch transmission block (1082) of the radial relay clutch transmission board (1084), or in a disengaged state for terminating the transmission of the rotary kinetic energy;

the clutch structure of the radial clutch structure (1087) and the output-end clutch structure (1052) consists of the friction-type clutch structure, the engaging-type clutch structure or the synchro-engaging clutch structure;

a middle rolling member (1085): which can be replaced by rolling balls, cone-shaped cylinders, or spherical or arc-shaped protrusions;

FIG. 10 is a cross sectional view of FIG. 9.

For the clutch actuated by torque of the present invention, it can be composed by two sets of torque-actuated clutches and having the same prime motive end (101), including:

1. two sets of clutches actuated by torque both transmitting in the axial direction, having different operation directions and having the same prime motive end (101);
2. two sets of clutches actuated by torque both transmitting in the axial direction, having the same operation direction and having the same prime motive end (101);
3. two sets of clutches actuated by torque both transmitting in the radial direction, having different operation directions and having the same prime motive end (101);
4. two sets of clutches actuated by torque both transmitting in the radial direction, having the same operation direction and having the same prime motive end (101);
5. two sets of clutches actuated by torque in which one set transmitting in the radial direction and the other transmitting in the axial direction, having different operation directions and having the same prime motive end (101);
6. two sets of clutches actuated by torque in which one set transmitting in the radial direction and the other transmitting in the axial direction, having the same operation direction and having the same prime motive end (101).

I claim:

1. A torque-actuated clutch, comprising:

a relay transmission structure assembly (104) including a relay coupling structure (204) having an active side connected to a rotary prime motive end (101) and a passive side that includes a relay output clutch structure (1051, 1077, or 1087), wherein the relay output clutch structure (1051, 1077, or 1087) engages an output-end clutch structure (1052) connected to an output end (102) when the active side of the relay coupling structure (204) is driven by the rotary prime motive end (101); and a torque-limiting sliding damping device (106) fixed to one of the relay transmission structure assembly (104) and a static housing (107) and slideably engaged with the other of the relay transmission structure assembly (104) and static housing (107), wherein:

when the active side of the relay coupling structure (204) is driven by rotation of the rotary prime motive end (101) in a first rotating direction, a damping effect between the torque-limiting sliding damping device (106) and the passive side of the relay coupling structure (204) results in relative movement between the damped passive and driven active sides of the relay coupling structure, which causes the relay output clutch structure (1051, 1077, or 1087) to perform a closing operation against a recovering force provided by at least one recovery actuation spring (120, 1073, or 1083) and engage the output-end clutch structure (1052) so as to transmit kinetic energy between the relay transmission structure assembly (104) and the output end (102); and when the active side of the relay coupling structure (204) ceases to be driven by rotation of the rotary prime motive end (101) in the first rotating direction, and when the active side of the relay coupling structure (204) is driven by rotation of the rotary prime motive end (101) in a second rotating direction opposite the first rotating direction, the at least one recovery actuation spring (120, 1073, or 1083) causes the output-end clutch structure (1052) to separate from the relay output clutch structure (1051, 1077, or 1087), thereby preventing transmission of kinetic energy between the relay transmission structure assembly (104) and the output end (102).

2. A torque-actuated clutch as recited in claim 1, wherein the sliding damping device (106) and relay coupling structure (204) interact by a damping force that includes one of a mechanical force, spring pre-stressing force, electromagnetic force exerted by an electrically excited coil, and permanent magnet force, the damping force acting between solid materials, a solid and a viscous fluid, viscous fluids, or between a solid and a gas or liquid, to generate the limited reverse torque that causes the movement between the active and passive sides of the relay output coupling structure.

3. A torque-actuated clutch as recited in claim 1, wherein the relay clutch structure (1051, 1077, or 1087) and output-end clutch structure (1052) together make up one of a friction-type clutch structure, engaging-type clutch structure, and synchro-engaging clutch structure.

4. A torque-actuated clutch as recited in claim 1, wherein said at least one recovery actuation spring (120) is a first coil spring that extends between the relay coupling structure (204) and the output end (102), and said relay coupling structure (204) includes a screw rod structure (1041) on the active side and a screw nut structure (1042) on the passive side.

5. A torque-actuated clutch as recited in claim 4, wherein said relay coupling structure (204) further includes a second coil spring (1043) that axially drives the passive side of the relay coupling structure (204) when the active side of the relay coupling structure is driven by the rotary prime motive end (101).

6. A torque-actuated clutch as recited in claim 1, further comprising a limiting structure (115) for limiting movement of the active side of the relay coupling structure (204) away from the output end (102).

7. A torque-actuated clutch as recited in claim 1, wherein the relay transmission structure assembly (104) is an axial compelling over-running clutch (1060) that includes the active side (1061) of the relay coupling structure (204), the passive side (1062) of the relay coupling structure (204), and middle rolling members (1063), wherein a plurality of saw-shaped intervals are formed between the active side (1061) and the passive side (1062) for accommodating the middle rolling members (1063) so as to provide an over-running clutch function.

8. A torque-actuated clutch as recited in claim 1, wherein the relay coupling structure (204) is an axial relay clutch assembly for actuating at least one axial relay clutch (1076) and said at least one recovery actuation spring is an axial clutch transmission block recovering spring (1073), said relay clutch assembly including an axial relay clutch transmission board (1074), and a middle rolling member (1075), wherein the axial clutch transmission block recovering spring (1073) extends between the axial relay clutch (1076) and the axial relay clutch transmission board (1074), the active side (1071) of the axial relay clutch assembly accommodates the middle rolling member (1075), the middle rolling member (1075) being coupled to a passive side of the axial relay clutch (1076) and arranged to engage an oblique surface of an axial clutch transmission block (1072) to cause the axial relay clutch to pivot and compress the axial clutch transmission block recovering spring (1073) when the middle rolling member (1075) is driven by the rotary prime motive end (101), pivoting of the axial relay clutch (1076) causing the relay output clutch structure (1077) on the axial clutch transmission block (1072) to engage the output-end clutch structure (1052).

9. A torque-actuated clutch as recited in claim 8, wherein a number of said at least one axial relay clutch (1076), each including said relay output clutch structure (1077), is at least two.

10. A torque-actuated clutch as recited in claim 8, wherein said sliding damping device (106) interacts with said axial relay clutch transmission board (1074) in a radial direction.

\* \* \* \* \*